UNITED STATES PATENT OFFICE.

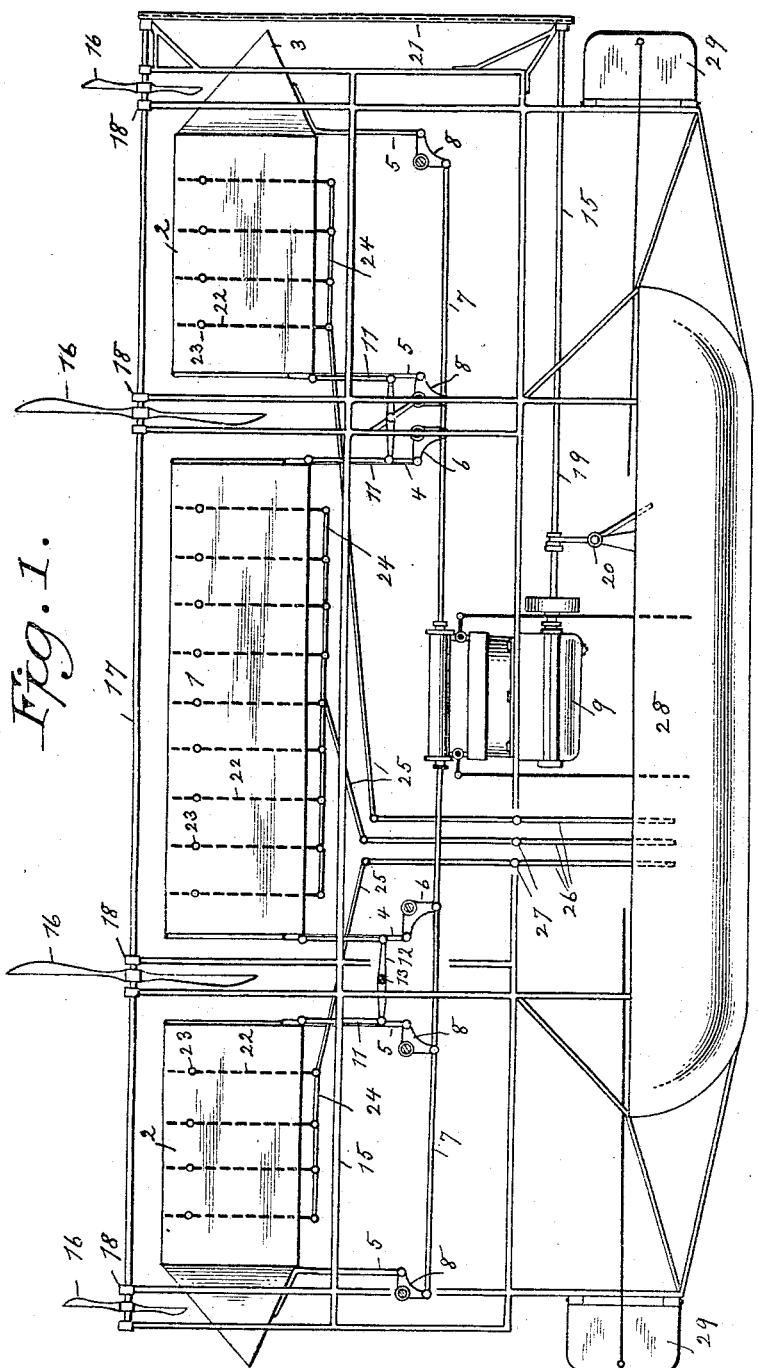

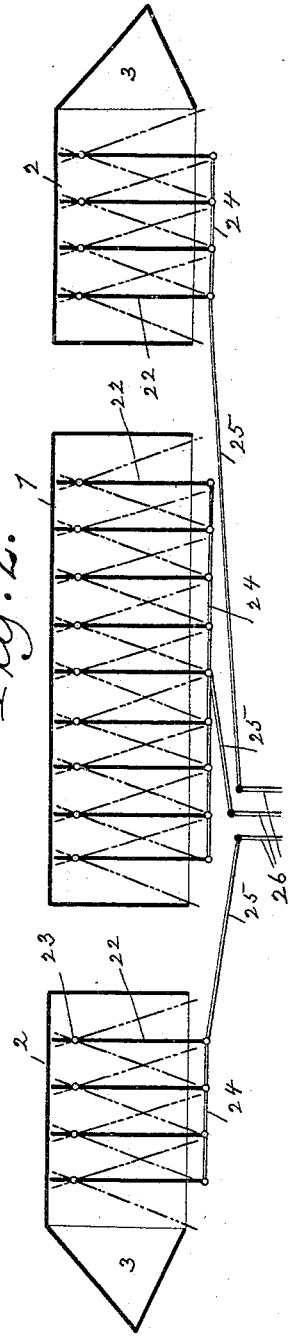
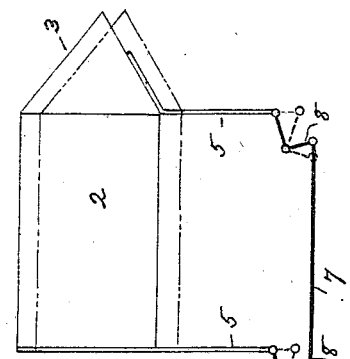
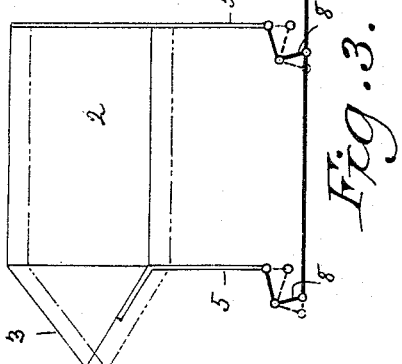
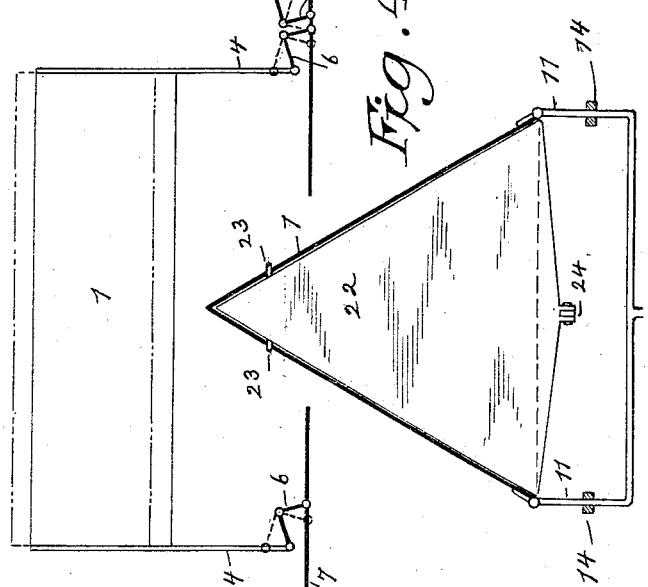

JOHN NEFF, SR., OF WEST HOBOKEN, NEW JERSEY.

AIRSHIP.

1,298,082.  Specification of Letters Patent.  Patented Mar. 25, 1919.

Application filed June 8, 1918. Serial No. 238,828.

*To all whom it may concern:*

Be it known that I, JOHN NEFF, Sr., a citizen of the United States, and a resident of West Hoboken, in the county of Hudson and State of New Jersey, have invented certain new and useful Improvements in Airships, of which the following is a specification.

This invention relates to an airship of novel construction, in which the ascent and descent is effected by means of a plurality of peaked wings, having open bottoms, and adapted to be vertically reciprocated alternately in opposite directions. Within each wing, are pivoted a number of transverse blades that may be tilted either backward or forward, so as to deflect the air and reduce pressure. With the wings coöperate propellers, that serve to move the ship through space.

The invention comprises the various features of novelty more fully pointed out in the specification and appended claims.

In the accompanying drawings:

Figure 1 is a side elevation of an airship embodying my invention;

Fig. 2, a longitudinal section of the wings;

Fig. 3, a diagram illustrating the stroke of the wings, and

Fig. 4, a vertical cross section through the central wing.

The airship is furnished with a number of vertically movable wings, which are hollow and of peaked form in cross section, three of said wings being shown. The sides of each wing diverge from the top downward, its ends are closed, while its bottom is open, to form in substance an inverted angular trough. The length of the central wing 1, should be about twice that of each of the end wings 2, so that the lifting power of the central wing, is equal to the joint lifting power of the two end wings. At its outer end, each of the end wings 2 runs out into a sharp edge or prow 3.

Means are provided for vertically reciprocating wing 1, and conjointly the two wings 2, alternately in opposite directions. These means are shown to consist of lifters 4, depending from wing 1 and lifters 5 depending from wings 2. Lifters 4 are by bell cranks 6 connected to an axially slidable rod 7, while lifters 5 are connected to said rod by bell cranks 8, that are disposed in a direction opposite to that of bell cranks 6. Rod 7 receives reciprocative movement from a motor 9 which is adapted to reciprocate a piston (not shown) within a cylinder 10, said piston in turn operating rod 7. It will be seen that by the means described, the desired alternate up and down movement may be imparted to lifters 4 and 5 and consequently to the wings 1 and 2. In order to steady the latter during such movement, each pair of adjoining wings is connected at its corners by a depending yoke or member 11 to a two arm lever 12 fulcrumed at 13 said yoke engaging suitable bearings 14 of the airship frame 15. Between and endwise of wings 1 and 2, are mounted propeller blades 16, fast on a horizontal shaft 17 extending over the wings and turning in bearings 18 of frame 15. The propeller shaft is shown to be operable from motor 9 by a shaft 19 controlled by clutch 20, and by chain drive 21.

Within each wing 1 and 2, there are arranged, a plurality of upright blades 22, which are pivoted thereto at 23, and have a cross section corresponding to that of the wings. The blades within each wing may be tilted conjointly either backward or forward, to which effect they are connected at their lower ends to a longitudinally disposed rod 24, which by link 25, is connected to a lever 26 pivoted at 27 and arranged within reach of the aviator seated within car 28. The airship is furnished with the usual rudders 29.

In order to effect an ascent, blades 22 are set in a vertical position and rapid reciprocating motion is imparted to the wings. During this motion, the peaked tops of the wings will during their upward movement, cut the air freely, while during the downward movement, the air entrapped within the wings will form a cushion, on which the machine is lifted. For advancing, the propellers 16 are actuated and the blades are set at a backward tilt, while for backing the blades are set at a forward tilt. For descending, the motion of the wings is retarded, while the blades may be either righted, or set at a dip, to effect the proper slant in landing.

A vertical or slanting ascent with a moderate speed may be obtained without using the propellers (when the operation will be noiseless) while when the propellers are used, a greater speed will be obtained. The weight of the frame as well as the hollow construction of the wings steady the machine and prevent it from capsizing, while in case of accident, the wings will operate in the manner of a parachute.

I claim:

1. In an airship, a peaked hollow central wing, a pair of peaked hollow end wings, the length of the central wing being equal substantially to the combined lengths of the two end wings, means for reciprocating the central wing, and means for conjointly reciprocating the end wings in a direction opposite to that of the central wing.

2. In an airship, a plurality of hollow wings, means for reciprocating said wings in opposite directions, a plurality of transverse blades pivoted within each wing, and means for tilting said blades.

3. In an airship, a plurality of hollow wings, means for reciprocating said wings in opposite directions, a plurality of transverse blades pivoted within each wing, a rod connecting said blades, and means for operating said rod.

4. In an airship, a plurality of hollow wings, members depending from the wings, two-arm levers engaged by the members of adjoining wings, means for guiding said members, lifters likewise depending from the wings, and means connected with said lifters for reciprocating said wings in opposite directions.

5. In an airship, a plurality of hollow wings, means for reciprocating said wings in opposite directions, transverse blades pivoted within the wings, a shaft extending above the wings, and a propeller carried by said shaft.

6. In an airship, a plurality of hollow wings, means for reciprocating said wings in opposite directions, transverse blades pivoted within the wings, a shaft extending above the wings, and propellers mounted on said shaft between and endwise of the wings.

JOHN NEFF, Sr.

Copies of this patent may be obtained for five cents each, by addressing the "Commissioner of Patents, Washington, D. C."